United States Patent
Delker et al.

(10) Patent No.: US 8,644,771 B1
(45) Date of Patent: Feb. 4, 2014

(54) SHORT RANGE WIRELESS POWER CONSUMPTION MANAGEMENT

(75) Inventors: Jason R. Delker, Olathe, KS (US); Sei Y. Ng, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 152 days.

(21) Appl. No.: 13/116,864

(22) Filed: May 26, 2011

(51) Int. Cl.
*H04B 7/00* (2006.01)

(52) U.S. Cl.
USPC ........ 455/69; 455/13.4; 455/3.01; 455/343.3; 455/574; 370/318; 370/328

(58) Field of Classification Search
USPC ............. 455/522, 69, 13.4, 41.2, 3.01, 343.3, 455/556.1, 574; 370/252, 270, 310, 318, 370/328
See application file for complete search history.

(56) References Cited

U.S. PATENT DOCUMENTS

| | | | |
|---|---|---|---|
| 5,450,616 A | 9/1995 | Rom | |
| 5,465,392 A | 11/1995 | Baptist et al. | |
| 5,465,398 A | 11/1995 | Flammer et al. | |
| 5,553,076 A | 9/1996 | Behtash et al. | |
| 5,553,316 A | 9/1996 | Diepstraten et al. | |
| 5,560,021 A | 9/1996 | Vook et al. | |
| 5,805,994 A | 9/1998 | Perreault et al. | |
| 5,923,702 A | 7/1999 | Brenner et al. | |
| 5,995,496 A | 11/1999 | Honkasalo et al. | |
| 6,192,230 B1 | 2/2001 | Van Bokhorst et al. | |
| 6,411,608 B2 | 6/2002 | Sharony | |
| 6,430,193 B1 | 8/2002 | Raissinia et al. | |
| 6,463,307 B1 | 10/2002 | Larsson et al. | |
| 6,549,568 B1 | 4/2003 | Bingel | |
| 6,738,469 B1 | 5/2004 | Peirce et al. | |
| 6,842,605 B1 | 1/2005 | Lappeteläinen et al. | |
| 7,162,250 B2 | 1/2007 | Misra | |
| 7,174,134 B2 | 2/2007 | Klein et al. | |
| 7,236,470 B1 | 6/2007 | Bims | |
| 7,324,785 B2 | 1/2008 | Hansen et al. | |
| 7,336,634 B2 | 2/2008 | del Prado et al. | |
| 7,400,901 B2 | 7/2008 | Kostic et al. | |
| 8,285,208 B2 * | 10/2012 | Terlizzi | 455/41.2 |
| 8,301,207 B2 | 10/2012 | Oh | |
| 8,509,179 B1 | 8/2013 | Delker et al. | |
| 8,565,818 B1 | 10/2013 | Bertz et al. | |
| 2004/0185902 A1 | 9/2004 | Yang | |
| 2005/0128970 A1 | 6/2005 | Tsien et al. | |
| 2007/0004444 A1 | 1/2007 | Klein et al. | |
| 2007/0202884 A1 | 8/2007 | Nykanen et al. | |
| 2008/0069316 A1 | 3/2008 | Walter et al. | |
| 2009/0086953 A1 | 4/2009 | Vendrow | |
| 2009/0270025 A1 * | 10/2009 | Kossi et al. | 455/3.01 |

(Continued)

OTHER PUBLICATIONS

Plamen Nedeltchev, "Wireless Local Area Networks and the 802.11 Standard," Mar. 31, 2001.

(Continued)

*Primary Examiner* — Shaima Q Aminzay

(57) ABSTRACT

A portable communication device is provided. The device comprises a first radio transceiver operable for wireless communication in an unlicensed radio spectrum band, a directional antenna coupled to the first radio transceiver, a processor, and an application. When executed by the processor, the application analyzes a power level of a signal received by the first radio transceiver and controls a transmission power level of the first radio transceiver based at least in part on the power level of the received signal.

11 Claims, 6 Drawing Sheets

(56) References Cited

U.S. PATENT DOCUMENTS

2009/0325625 A1* 12/2009 Hugl et al. .................. 455/522
2010/0099419 A1   4/2010 Hanson et al.
2010/0234051 A1   9/2010 Holden et al.
2010/0285828 A1* 11/2010 Panian et al. ................ 455/522
2011/0143723 A1   6/2011 Shaw et al.

OTHER PUBLICATIONS

Breeze Wireless Communications, Ltd., "IEEE 802.11 Technical Tutorial," 1998.
Bob O'Hara and Al Petrick, "The IEEE 802.11 Handbook: A Designer's Companion," 1999, pp. 88-93.
Office Action dated Oct. 10, 2007, U.S. Appl. No. 10/836,372, filed Apr. 30, 2004.
Final Office Action dated Apr. 17, 2008, U.S. Appl. No. 10/836,372, filed Apr. 30, 2004.
Office Action dated Sep. 8, 2008, U.S. Appl. No. 10/836,372, filed Apr. 30, 2004.
Final Office Action dated Mar. 17, 2009, U.S. Appl. No. 10/836,372, filed Apr. 30, 2004.
Advisory Action dated May 13, 2009, U.S. Appl. No. 10/836,372, filed Apr. 30, 2004.
Examiner's Answer dated Jul. 7, 2010, U.S. Appl. No. 10/836,372, filed Apr. 30, 2004.
Delker, Jason R., et al. "Method and System for Power Control in a Wireless LAN", filed Apr. 30, 2004, U.S. Appl. No. 10/836,372.
Bertz, Lyle T., et al. "Broadband Wireless Router", filed Oct. 5, 2010, U.S. Appl. No. 12/898,121.
Wikipedia, "Ajax Programming", dated Jul. 6, 2010, http://en.wikipedia.org/w/index.php?title=Ajax_(programming)&printable=yes.
Pre-Interview Communication dated Jan. 30, 2013, U.S. Appl. No. 12/898,121, filed Oct. 5, 2010.
Notice of Allowance dated Apr. 24, 2013, U.S. Appl. No. 12/898,121, filed Oct. 5, 2010.
Notice of Allowance dated Apr. 8, 2013, U.S. Appl. No. 10/836,372, filed Apr. 30, 2004.

* cited by examiner

SHORT RANGE WIRELESS POWER CONSUMPTION MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable communication devices may be used by private individuals to maintain nearly ubiquitous voice and data communications connectivity. Portable communication devices may have a plurality of radio transceivers to promote communication according to a plurality of different wireless communication protocols and/or in a variety of different radio spectrum bands. Technical innovation continues to be applied to refining and elaborating the capabilities and functionality of portable communication devices.

SUMMARY

In an embodiment, a portable communication device is disclosed. The device comprises a first radio transceiver operable for wireless communication in an unlicensed radio spectrum band, a directional antenna coupled to the first radio transceiver, a processor, and an application. When executed by the processor, the application analyzes a power level of a signal received by the first radio transceiver and controls a transmission power level of the first radio transceiver based at least in part on the power level of the received signal.

In an embodiment, a method of power management in a portable communication device is disclosed. The method comprises, in response to a first triggering event, a first portable communication device negotiating a first transmission power level for wireless communication in an unlicensed radio spectrum band with a second portable communication device, wherein the first portable communication device is mechanically coupled to the second portable communication device. The method further comprises storing a value of the first transmission power level in the first portable communication device and transmitting wireless communication by the first portable communication device to the second portable communication device at a power level limited by the first transmission power level.

In another embodiment, a method of power management in a portable communication device. The method comprises automatically placing a first radio transceiver of a first portable communication device in a sleep mode of operation, wherein the first radio transceiver is unable to transmit and consumes reduced power when in the sleep mode, and wherein the first radio transceiver is operable to provide wireless communication in an unlicensed radio spectrum band when in an awake mode of operation. The method further comprises, in response to receiving a first communication by a second radio transceiver of the portable communication device when the first radio transceiver is in sleep mode, automatically placing the first radio transceiver in the awake mode, wherein the second radio transceiver is operable to provide wireless communication in a licensed radio spectrum band. The method further comprises receiving via the first radio transceiver a second communication from a second portable communication device mechanically coupled to the first portable communication device, wherein the second communication is associated with responding to the first communication.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
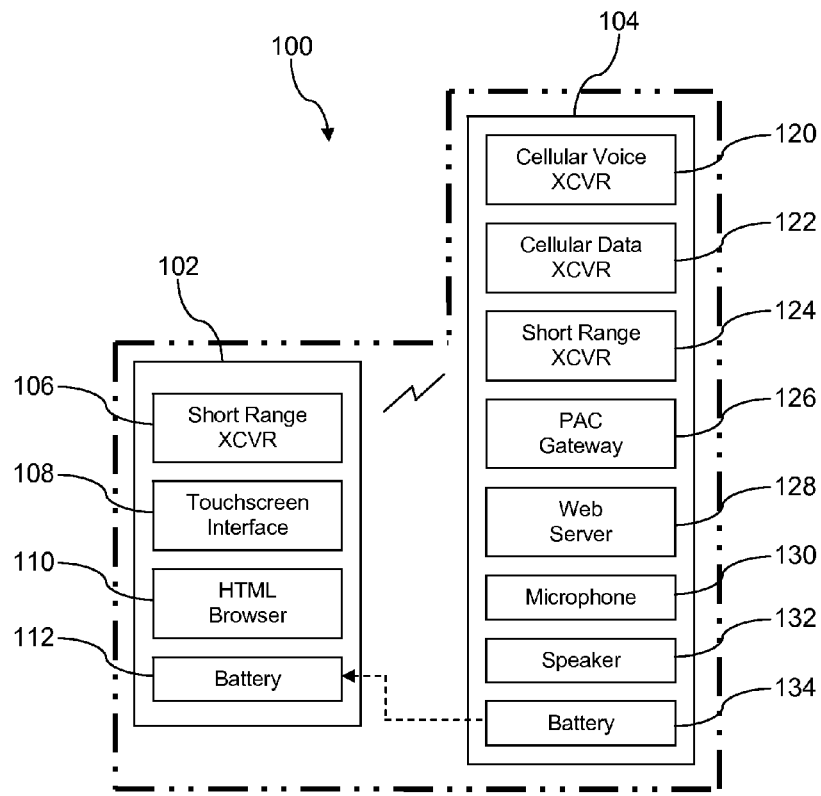
FIG. 1 is a block diagram of coupled communication devices according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a first portable communication device may be mechanically coupled to a second portable communication device. Alternatively, the first and second portable communication devices may be placed in proximity to each other. The first portable communication device and the second portable communication device may communicate via short range radio communications, and the second portable communication device may promote long range communications. The first portable communication device may have a short range radio transceiver but lack a long range radio transceiver. For example, the first portable communication device may have a WiFi radio transceiver and/or a BLUETOOTH radio transceiver but may lack a cellular radio transceiver. The second portable communication device may have one or more short range radio transceivers as well as one or more long range radio transceivers. For example, the second portable communication device may have a WiFi radio transceiver and/or a BLUETOOTH radio transceiver as well as one or more cellular radio transceivers. In an embodiment, the second portable communication device may originate a voice call via the long range radio transceiver in response to the first portable communication device providing dialed digits to the second portable communication device via short range radio communication. The second portable communication device may also access and/or transmit data via the long range radio transceiver, for example media content, in response to the first portable communication device providing a universal reference locator (URL) to the second portable communication device via short range radio communication.

The present disclosure teaches a system and methods for managing the power levels of the short range radio transceivers of one and/or both of the two portable communication devices. The second portable communication device may comprise a directional antenna and supporting components that promote steering a beam of the antenna to align with an antenna of the first portable communication device such that the transmit power of the short range radio of the first portable communication device and/or the second portable communication device can be decreased while continuing to maintain reliable communications over the short range radio link. As is understood by those skilled in the art, the term antenna beam refers not to a physical structure of the antenna but rather to the disposition of a radiation pattern associated with the antenna. For example, an antenna beam may refer to a lobe of an antenna radiation pattern. Because of the principle of antenna reciprocity, the radiation pattern of the antenna is equally descriptive of the radio reception of the subject antenna. Alternatively, the directional antenna may be configured to direct a beam in a fixed direction based on the known location of the corresponding antenna of the first portable communication device when the first and second communication devices are mechanically coupled.

In an embodiment, the directional antenna may comprise two or more elements. The transmit circuit may split a first transmit signal into a plurality of equivalent but parallel second transmit signals and phase shift some of the second transmit signals before feeding to the antenna elements to steer the beam of the antenna. Due to the principle of antenna reciprocity, the receive antenna beam may be controlled in a similar manner by shifting the relative phase among a plurality of parallel receive signals provided by the antenna elements before combining the phase shifted receive signals. The beam of the antenna may be steered to different angles by adapting the phase offset among the parallel transmit signals and/or among the parallel receive signals. The second portable communication device may respond to a first triggering event by steering the beam of the antenna to a variety of directions, determine a received signal strength (for example, associated with a signal received from the short range radio of the first portable communication device) associated with each beam direction, and identify a preferred antenna beam direction, for example the direction of an antenna coupled to the short range radio transceiver of the first portable communication device.

Once the preferred antenna beam direction is determined, the second portable communication device may continue to direct the antenna beam to this preferred direction until a second triggering event occurs. The preferred direction of the antenna beam will depend principally on the relative positions of the antenna of the first portable communication device and the antenna of the second portable communication device and on the structures of the first portable communication device and of the second portable communication device. In a common operation mode, the first and second portable communication devices may be operated as a unit and maintained in a substantially constant position relative to each other. In this circumstance, once a preferred antenna beam direction of the antenna of the second portable electronic device has been determined, there may be little benefit to re-identifying the preferred antenna beam direction. Triggering events are discussed further hereinafter, but as an example a triggering event may comprise the second portable communication device powering on.

The first and second portable communication devices may initiate a transmission power level negotiation on a third triggering event, for example when the devices establish a communication link between them for the first time and/or after aligning the antenna beam of the second portable communication device. The negotiation may include starting at a first power level and transmitting at a plurality of different power levels. The receiving device sends back one or more messages indicating the nature of their reception of the transmitted signal. The transmission power may be dropped until the receiving device fails to properly receive the transmitted signal, for example experiences bit errors or other communication failure. At this point, the transmitting device may set a transmission power level that is increased by a predefined amount relative to the last successful transmission power level, whereby to provide a margin of reliability. Alternatively, the transmission power may be started at a low value and increased until the opposite device replies with an acknowledgement of receipt, at which point the transmit signal may be set relative to this minimum power threshold, for example a power level that is increased by a predetermined amount relative to the first successful transmission power level, whereby to provide a margin of reliability. This procedure can be followed to configure the transmission power level of both devices. The procedure can be conducted in serial or in parallel. In an embodiment, the power level negotiation may preferably be conducted after the antenna beam of the second portable communication device has been aligned. The transmission power levels configured for the two portable communication devices may continue to be used until a fourth triggering event occurs, for example one or the other of the two portable communication devices powering on. While the two portable communication devices remain in a static locational relationship with each other, there may be no benefit to renegotiating the transmit power levels.

The short range radio transceiver of one or more of the portable communication devices may transition to a sleep mode after a period of inactivity, in order to conserve and manage battery power. For example, after a predefined period of time during which the second portable communication device has not received a phone call on its long range radio transceiver or a web service request from the first portable communication device via its short range radio transceiver, the second portable communication device may turn off its short range radio transceiver. The short range radio transceiver of the second portable communication device may remain turned off until an incoming voice call is received by the long range radio transceiver of the second portable communication device. The short range radio transceiver of the second portable communication device may also be commanded to reawaken by actuating a control button on the second portable communication device, for example by momentarily pressing a power button of the second portable communication device.

The short range radio transceiver of the first portable communication device may also transition to a sleep mode after a period of inactivity, in order to conserve and manage battery power. The short range radio transceiver of the first portable communication device may wake up when a touch screen or other interface of the first portable communication device is actuated in any way. In an embodiment, a voice call may be received by the long range radio transceiver of the second portable communication device. In response to the incoming voice call, the second portable communication device may present an aural alert, such as playing back a ring tone over a speaker of the second portable communication device. The user of the package comprising the first and second portable communication device may respond to the aural alert by touching the touch pad of the first portable communication device, and the first portable communication device may respond to the input to the touch pad by reawakening its short range radio transceiver.

Turning now to FIG. 1, a communication device 100 is described. The communication device 100 comprises a first portable communication device 102 and a second portable communication device 104. The portable communication devices 102, 104 may be mechanically coupled together or placed into proximity to one another. For example, the second portable communication device 104 may mechanically couple to the first portable communication device 102 using a flexible sleeve that at least partially surrounds the first portable communication device 102, for example a flexible plastic sleeve. The second portable communication device 104 may comprise a housing that is configured to receive and hold the first portable communication device 102, for example a recess into which the first portable communication device 102 may be positioned and held in place by a friction fit, a snap fit, or other. In an embodiment, the first portable communication device 102 may comprise a first short range radio transceiver 106, a touch screen interface 108, a hyper text mark-up language (HTML) browser 110, and a first battery 112. The first short range radio transceiver 106, for example, may be a WiFi radio transceiver or a BLUETOOTH radio transceiver. It is understood that the first portable communication device 102 may vary somewhat from its depiction in FIG. 1. For example, the first portable communication device 102 may have an additional short range radio transceiver (not shown). The first portable communication device 102 may have an interface other than a touch screen interface. The first portable communication device 102 may have a content access application other than a hyper text mark-up language browser. In an embodiment, the first portable communication device 102 may have a long range radio transceiver. It is understood that the first portable communication device 102 may comprise additional components that are not shown to avoid unnecessarily cluttering FIG. 1.

The second portable communication device 104 may comprise a first long range radio transceiver 120, a second long range radio transceiver 122, a second short range radio transceiver 124, a public access control (PAC) gateway application 126, a web server application 128, a microphone 130, a speaker 132, and a second battery 134. The first long range radio transceiver 120 may be a cellular voice radio transceiver that promotes voice communication according to one or more of a code division multiple access (CDMA) wireless protocol, a global system for mobile communication (GSM) wireless protocol, a long-term evolution (LTE) wireless protocol, a worldwide interoperability for microwave access (WiMAX) wireless protocol, or the like wireless protocol. The second long range radio transceiver 122 may be a cellular data radio transceiver that promotes data communication according to one or more of the wireless protocols identified above. In an embodiment, the first long range radio transceiver 120 may promote voice communication according to a code division multiple access one times radio transmission technology (CDMA 1xRTT) wireless protocol, and the second long range radio transceiver 122 may promote data communication according to a code division multiple access evolution data only revision A (CDMA EVDOrA) wireless protocol.

It is understood that the second portable communication device 104 may vary somewhat from its depiction in FIG. 1. For example, the second portable communication device 104 may have a single long range radio transceiver instead of two long range radio transceivers. The second portable communication device 104 may comprise two short range radio transceivers, for example both a WiFi radio transceiver and a BLUETOOTH radio transceiver. It is understood that the second portable communication device 104 may comprise additional components that are not shown to avoid unnecessarily cluttering FIG. 1.

In an embodiment, the first portable communication device 102 and the second portable communication device 104 may be held and operated by a user as an integrated unit and/or assembly. It is contemplated, however, that the first portable communication device 102 and the second portable communication device 104 may be sold and/or distributed separately. Additionally, the first portable communication device 102 may be operated independently of the second portable communication device 104, although the first portable communication device 102 may lack voice communication capability in the absence of the second portable communication device 104. Further, some of the functionality described below may be provided when the first portable communication device 102 and the second portable communication device 104 are separated but in proximity to each other, for example when the first portable communication device 102 is close enough to the second portable communication device 104 that the first short range radio transceiver 106 and the second short range radio transceiver 124 are able to establish a radio link with each other. In an embodiment, there may be a coupling between the first battery 112 of the first portable communication device 102 and the second battery 134 of the second portable communication device 104, whereby the second battery 134 may provide supplemental power to the first battery 112 and/or to the first portable communication device 102. In an embodiment, the second battery 134 may be coupled to the first portable communication device 102 in such a way as to provide power for recharging the first battery 112.

In an embodiment, the first time the browser 110 transmits a request to access content via the first short range radio transceiver 106 while the first portable communication device 102 is coupled or proximate to the second portable communication device 104, the second short range radio transceiver 124 receives the transmission of the first short range radio transceiver 106, and the PAC gateway 126 intercepts the content request. In response to intercepting the content request, the PAC gateway 126 transmits a dialer shortcut initializer content via the second short range radio transceiver 124 to the first short range radio transceiver 106, and the browser 110 displays the dialer shortcut initializer content, for example on the touch screen interface 108. The dialer shortcut initializer content may comprise hyper text mark-up language comprising active instructions. The dialer shortcut initializer content, when displayed, may invite a user of the first portable communication device 102 to click a control button to install a dialer shortcut to a dialer and/or web dialer on the touch screen interface 108.

When the dialer shortcut is installed on the touch screen interface 108, when the user of the first portable communication device 102 actuates the dialer shortcut, the web browser 110 sends a message to the web server 128 via the first short range radio transceiver 106 and the second short range radio transceiver 124 requesting a dialer be displayed on the touch screen interface 108. When the dialer is displayed and when the user actuates a dialer button, the dialer sends a message indicating the actuated dialer button via the short range radio transceivers 106, 124 to the web server 128. The web server 128 translates the indication of the actuated dialer button to an AT command and sends the AT command to the first long range radio transceiver 120 to provide a dialed digit. After a succession of dialed digits are provided to the first long range radio transceiver 120 in this way, the first long range radio transceiver 120 may originate a voice call to a called party. When the call is established, two-way communication on the call may be supported by the second portable communication device 104, for example by receiving voice audio from the microphone 130, encoding this audio, transmitting this audio as a wireless signal and by receiving audio from the called party, decoding this audio, and playing back the audio over the speaker 132.

When a call to the second portable communication device 104 is originated, the second portable communication device 104 may alert about the incoming call by sounding an audio alert, by vibrating, or by presenting a visual alert. The call may be received by pressing a call receive button on the second portable communication device 104. Alternatively, the call may be received by actuating the dialer shortcut on the first portable communication device 102, the hyper text markup language browser 110 may request a dialer interface from the web server 128, a dialer interface may be returned to the hyper text markup language browser 110, and the dialer interface may be presented on the first portable communication device 102. The dialer interface may provide controls for answering an in-coming phone call and/or for terminating a phone call as well as controls for inputting dialed digits.

In an embodiment, when a voice message is pending in a voice message storage box, for example stored in a data store coupled to a voice mail server, an alert may be sent to the second portable communication device 104, and the second portable communication device 104 may alert about the pending voice message by sounding an audio alert, by vibrating, or by presenting a visual alert. The alerts associated with a pending voice message may be distinct from the alerts associated with an incoming voice call. By actuating the dialer shortcut on the first portable communication device 102, the hyper text markup language browser 110 may request a dialer interface from the web server 128, a dialer interface may be returned to the hyper text markup language browser 110, and the dialer interface may be presented on the first portable communication device 102. The dialer interface may provide controls for calling to a voice mail server to retrieve pending voice messages and to perform other actions related to voice mail, for example voice mailbox housekeeping tasks, replaying stored voice messages, and other actions.

In an embodiment, the dialer interface may provide controls for entering a universal reference locator and retrieving content via the web server 128 of the second portable communication device 104. The web server 128 may retrieve the requested content via the cellular data transceiver 122. In some circumstances, data services provided over the wireless link provided by the cellular data transceiver 122 may provide higher speed data communication than data services provided over the wireless link provided by the first short range radio transceiver 106 of the first portable communication device 102 and/or by a long range radio transceiver of the first portable communication device 102. The dialer interface further may provide access to controls to add contacts to an address book and to originate calls based on the address book. The contact information may be stored in a memory of the second portable communication device.

Figure 2:
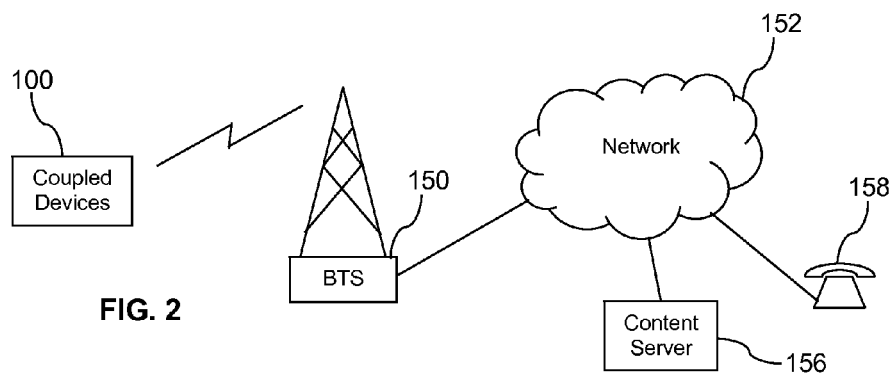
FIG. 2 is a block diagram of a communication system according to an embodiment of the disclosure.

Turning now to FIG. 2, a communication system is described. The communication device 100, comprising the first portable communication device 102 and the second portable communication device 104, may establish a wireless link with a base transceiver station (BTS) 150, for example the first long range radio transceiver 120 and/or the second long range radio transceiver 122 of the second portable communication device 104 may establish a wireless link with the base transceiver station 150. The base transceiver station 150 may couple the communication device 100 into the network 152. The network 152 may comprise a public voice communication network, a public data network, a private network, or a combination thereof. The network 152 may promote coupling the communication device 100 to a content server 156 for downloading content to the communication device 100 and/or uploading content from the communication device 100 to the content server 156. The network 152 may promote coupling the communication device 100 to a voice mail server and/or voice message mailbox. The network 152 may promote establishing voice calls between the communication device 100 and a telephone 158. While illustrated in FIG. 2 as a land-line phone, it is understood that the telephone 158 may be any telephone, for example a mobile phone, a land-line phone, a headset type of phone, a voice over IP (VoIP) phone, or other type of telephone. To receive wireless communication services via the base transceiver station 150, it may be necessary for the communication device 100 to be provisioned for wireless service, for example in association with a wireless subscription account. In an embodiment, the second portable communication device 104 may be provisioned for wireless communication service. For further details about the communication device 100, the first portable communication device 102, and the second portable communication device 104, see U.S. patent application Ser. No. 12/898,121, filed Oct. 5, 2010, entitled "Broadband Wireless Router," by Lyle T. Bertz, et al., which is incorporated herein by reference for all purposes.

Figure 3:
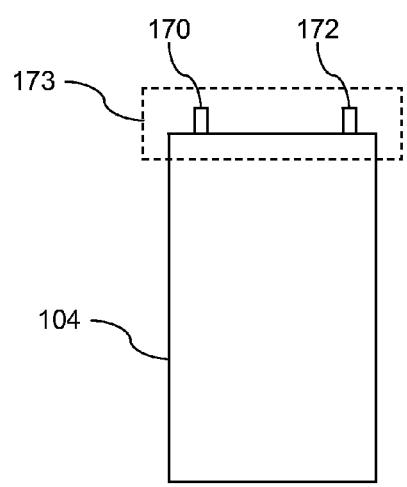
FIG. 3 is an illustration of a communication device according to an embodiment of the disclosure.

Turning now to FIG. 3, an embodiment of the second portable communication device 104 is discussed. In an embodiment, the second portable communication device 104 may have a plurality of antenna elements, for example a first antenna element 170 and a second antenna element 172. In other embodiments, the second portable communication device 104 may have a single antenna element or more than two antenna elements. The antenna elements 170, 172 may be referred to in some contexts as a single antenna 173. In some contexts, the antenna 173 may be referred to as a directional antenna. Alternatively, the antenna elements 170, 172 may be referred to as an antenna array 173. The antenna 173 may comprise additional components (not shown) that promote splitting and/or combining radio signals, for example radio frequency splitters, radio frequency combiners, and/or radio frequency hybrids. The antenna 173 may also comprise one or more components for adjusting the phase between the signals transmitted to each of the antenna elements 170, 172 and/or adjusting the phase between the signals received from each of the antenna elements 170, 172. The antenna 173 may be used by the second short range radio transceiver 124 to transmit wireless signals to and receive wireless signals from the first short range radio transceiver 106.

By adjusting the phase between the antenna elements 170, 172, the directionality of the antenna 173 may be adjusted or adapted to promote improved communication with the first short range radio transceiver 106 of the first portable communication device 102. For example, by directing a beam of the antenna 173 towards a corresponding antenna coupled to the first short range radio transceiver 106, both the second short range radio transceiver 124 and the first short range radio transceiver 106 may communicate effectively with reduced transmit power relative to a non-directional antenna.

Figure 4A:
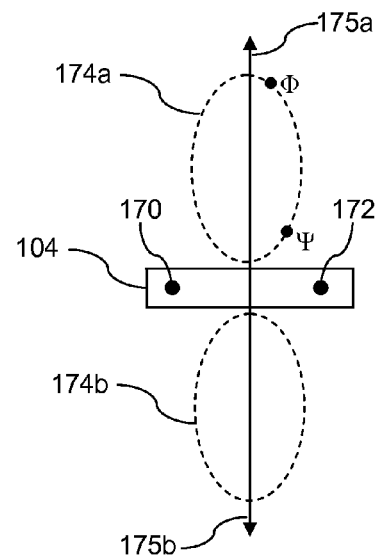
FIG. 4A is an illustration of an antenna pattern according to an embodiment of the disclosure.
Figure 4B:
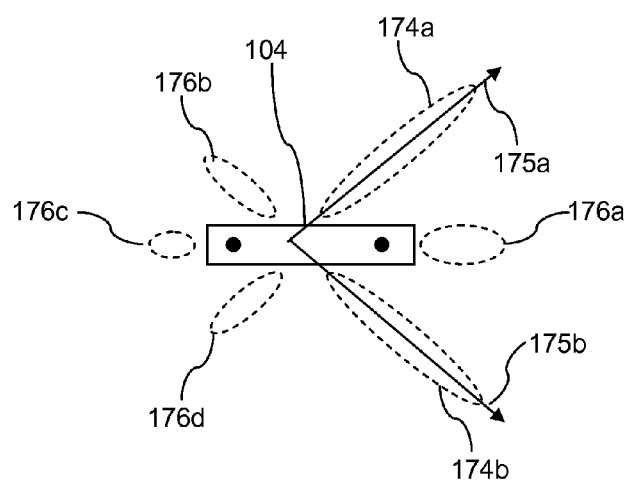
FIG. 4B is an illustration of another antenna pattern according to an embodiment of the disclosure.

While for reasons of ease of illustration and discussion, the antenna 173 illustrated in FIG. 3, FIG. 4A, and FIG. 4B comprises an array of two dipole or monopole antenna elements, the present disclosure contemplates using other kinds of electronically steerable directional antennas which may also be suitable for embodying the teachings herein. In an embodiment, an antenna may comprise any radiating device, and any plurality of radiating elements may be used for producing an electronically steerable antenna beam. For example, the antenna 173 may be implemented as a plurality of separately fed patch antennas. The antenna 173 may be implemented as a slot antenna having a plurality of apertures that are separately fed. Yet other electronically steerable directional antennas may be suitable for implementing some aspects of the present disclosure. While illustrated located on an end of the second portable communication device 104, the antenna 173 may be located in other locations in the device 104, for example, near a surface of a package enclosing the electrical and electronic components of the second portable communication device 104 and in about the middle of the second portable communication device 104. Also, because the communication via the antenna 173 is expected to occur over a very short range and using unlicensed spectrum, in an embodiment the antenna 173 may be simple and/or inefficient.

It is understood that the present disclosure also contemplates using directional antennas which are configured to provide a fixed directionality. The antenna 173 may be coupled to the short range transceiver 124 with predetermined phasing between antenna elements, thereby producing a substantially fixed antenna beam direction. The beam of the antenna 173 may be designed and manufactured to center on or aim at the corresponding antenna of the first portable communication device 102 based on the expected location of the first portable communication device 102 when it is mechanically coupled to the second portable communication device 104.

Turning to FIG. 4A and FIG. 4B, an example of steering a main lobe and/or beam of an antenna pattern is discussed. The view of FIG. 4A and FIG. 4B may be considered to be looking down on the second portable communication device 104 from above. In FIG. 4A, adapting the phase of the antenna elements 170, 172 results in two main lobes of the antenna pattern, a first main lobe 174*a* and a second main lobe 174*b*. The antenna pattern is a polar plot and shows a dotted line of constant power or constant signal strength. The point Φ may have the polar coordinate (100 feet, 80 degrees), and the point ψ may have the polar coordinate (15 feet, 45 degrees). From the illustrated antenna pattern, it can be seen that rather than radiating uniformly in all directions (hence, non-directional), the antenna 173 radiates differently in different directions—concentrating radiated radio power in some directions and reducing radiated radio power in other directions. The antenna 173 may be thought to focus the transmission radio power along the first beam 175*a* and the second beam 175*b*. A consequence of directing one of the beams 175 at a receiver is that less transmission energy can be used relative to a less directional antenna pattern to result in equal radio power delivered to a point proximate to the antenna beam 175. The directionality of an antenna is often compared to a unidirectional antenna, such as a single element dipole antenna, and may be quantified as an antenna gain. The higher the degree of directionality of an antenna—the more tightly focused the antenna beam—the higher the antenna gain. Because of the reciprocity of antennas—statements regarding the transmission of an antenna are equally valid regarding the reception of the antenna—a transmitter located near one of the beams 175 may transmit with less transmission energy relative to a less directional antenna pattern In FIG. 4B, the phasing of the antenna 173 has been adapted to direct the beams 175 as illustrated. It may happen that as the main lobes 174 are steered away from their position in FIG. 4A that secondary lobes 176 may appear. Energy is also radiated in the directions of the secondary lobes 176, in the case of antenna transmission. Secondary lobes 176 may be undesirable but unavoidable consequences of electronically steering the antenna beams 175 away from their position in FIG. 4A. It is understood that the antenna patterns illustrated in FIG. 4A and FIG. 4B are for illustrative purposes only to support the discussion herein of electronically steering the beams 175 of the antenna 173. In an embodiment, the antenna patterns associated with the antenna 173 may be different from those illustrated in FIG. 4A and in FIG. 4B. For example, in the case of a planar antenna 173, for example a plurality of patch antennas, a ground plane may be employed that effectively excludes the radiation from the opposite side of the ground plane from the patch antennas.

A first radio frequency signal may be split into a second radio frequency signal and a third radio frequency signal of approximately equal amplitudes, for example by using a radio frequency splitter and/or hybrid. Each of the second and third signal may have a power of about −3 dB relative to the power of the first signal. The second signal may be fed to the first antenna element 170 for radiation from the first antenna element 170, and the third signal may first be phase shifted relative to the second signal, for example using a first phase shifting component, and then fed to the second antenna element 172 for radiation from the second antenna element 172. The first antenna element 170 may receive a fourth radio frequency signal and feeds this fourth radio frequency signal into a radio frequency combiner and/or hybrid. The second antenna element 172 may receive a fifth radio frequency signal and feeds this fifth radio frequency signal to a second phase shifting component and feeds the phase shifted signal to the radio frequency combiner and/or hybrid. The radio frequency combiner and/or hybrid produces a sixth radio frequency signal that is the combination of the fourth signal and the phase shifted version of the fifth signal. In an embodiment, the phase shift produced by the first phase shifter and the second phase shifter are substantially equal. In an embodiment, the same phase shifter component provides the functionality of the first phase shifter and the second phase shifter. The amount of phase shift that is introduced by the phase shift components may be controlled electronically, for example under control of a processor of the second portable communication device 104 that executes an application to adapt the main beams 175 to align with a preferred peer antenna, for example an antenna coupled to the first portable communication device 102.

In an embodiment, on an event the second portable communication device 104 may adapt the direction of the main beam 175 of the antenna 173 to align with the antenna of the first portable communication device 102. For example, an application executing on a processor of the second portable communication device 104 may request the first portable communication device 102 to transmit a constant amplitude radio signal during a test interval. During the test interval, the application may cause the main beams 175 of the antenna 173 to scan over a range of directions to detect the direction of greatest received signal strength and hence the direction in which at least one of the main beams 175 align with the antenna of the first portable communication device 102. The application may store the alignment direction in memory and may electronically steer the antenna 173 to direct one of its main beams 175, for example the first main beam 175A, in the direction indicated by the stored value. In an embodiment, the value stored in memory may be an angular direction, a phase offset of one or more antenna elements, or other information. Aligning one of the beams 175 with an antenna coupled to the first short range radio transceiver 106 may enable reducing the transmission energy expended by the second portable communication device 104 and/or by the first portable communication device 102.

Figure 5:
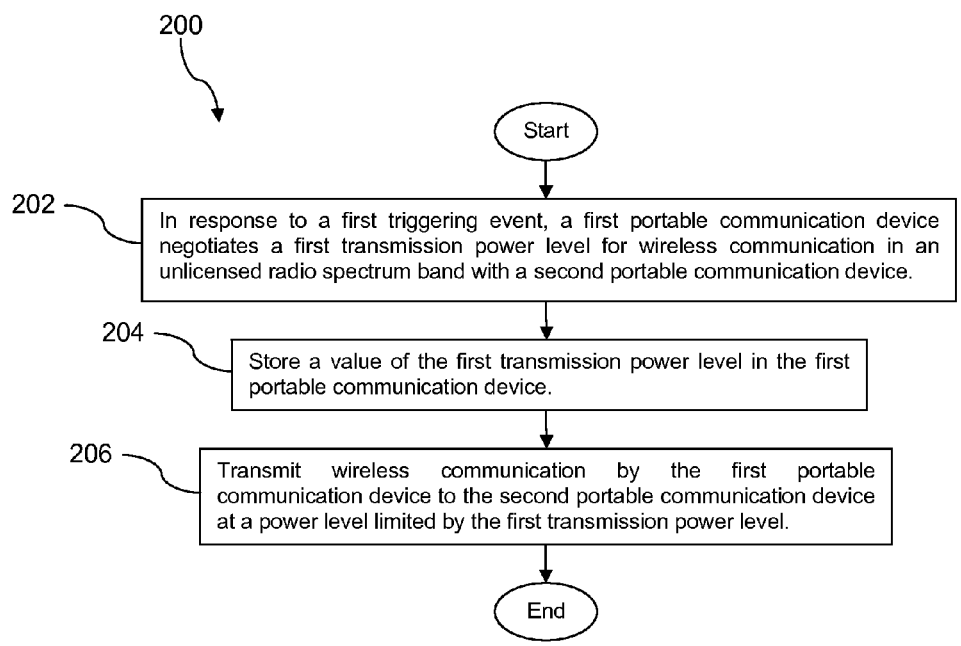
FIG. 5 is a flow chart of a method according to an embodiment of the disclosure.

Turning now to FIG. 5, a method 200 is described. At block 202, in response to a first triggering event, a first portable communication device 102 negotiates a first transmission power level for wireless communication in an unlicensed radio spectrum band with a second portable communication device 104. The first portable communication device 102 may be mechanically coupled to the second portable communication device 104 as described further above. Alternatively, the first portable communication device 102 may not be mechanically coupled to the second portable communication device 104, and the two devices may simply be in proximity to each other, for example close enough for establishing a wireless communication link between their short range radio transceivers 106, 124. For example, the first portable communication device 102 negotiates a first transmission power level with the second portable communication device 104, or the second portable communication device 104 negotiates the first transmission power level for wireless communication in the unlicensed radio spectrum band with the first portable communication device 102. The unlicensed radio spectrum band may be associated with WiFi wireless communication, with BLUETOOTH wireless communication, or with another short range wireless communication protocol.

The first triggering event may be a power-on event of the first portable communication device 102. The first triggering event may be a first time that the first portable communication device 102 has been in proximity to the second portable communication device 104, for example the first time the first portable communication device 102 and the second portable communication device 104 have discovered each other. The first triggering event may be a first scheduled time. For example, the first portable communication device 102 may initiate transmission power level negotiation with the second portable communication device 104 periodically, for example daily, weekly, monthly, or on some other periodic interval. The first triggering event may be a manual activation of an input of the first communication device, for example a short duration actuation of a power button. The first triggering event may be another suitable triggering event.

The first portable communication device 102 may negotiate the power level according to a variety of methods or techniques. The first portable communication device 102 may begin a series of communication cycles with the second portable communication device 104 where the first portable communication device 102 sends a message to the second portable communication device 104, and the second portable communication device 104 replies with an acknowledgement or acknowledgement message when it receives the message from the first portable communication device 102. In an embodiment, the acknowledgement message may include information about the signal received by the second portable communication device 104. For example, the acknowledgement message may comprise a signal strength value, a signal to noise ratio (SNR) value, or some other indication of the quality of the radio signal received by the second portable communication device 104. The first portable communication device 102 may send the first message with a relatively high wireless transmission power level and decrement the wireless transmission power level with each subsequent message transmitted to the second portable communication device 104. When the second portable communication device 104 fails to reply with an acknowledgement, the first portable communication device 102 may conclude that the last wireless transmission power level was inadequate.

In an embodiment, the power level may be adjusted lower in equal increments. Alternatively, the power level may be adjusted lower by an amount proportional to the previous power level, for example 80% of the previous power level, 65% of the previous power level, 50% of the previous power level, or some other fraction of the previous power level. The power level may be adjusted lower by 1.5 dB (−1.5 dB relative to previous power level), by 3 dB (−3 dB relative to previous power level), or by some other amount. Alternatively, the power level may be adjusted lower based on information included in the acknowledgement message. For example, based on a signal to noise ratio that is 15 dB greater than deemed effective for receiving the radio transmission, the power level may be reduced by 12 dB in the next cycle of power negotiation.

In an embodiment, the first portable communication device 102 may retransmit a second message at the same wireless transmission power level. If the second portable communication device 104 does not reply to either the first or the second message at the subject low wireless transmission power level, the first portable communication device 102 may then conclude that the last wireless transmission power level is inadequate. Otherwise, if the second portable communication device 104 replies to the second message, the first portable communication device 102 may resume the sequence of successively weaker wireless transmissions.

Alternatively, the first portable communication device 102 may start at a low transmission power level and increase the transmission power level until it receives an acknowledgement from the second portable communication device 104. The first portable communication device 102 may increase the power level by a constant amount of power every successive time it transmits to the second portable communication device 104. Alternatively, the first portable communication device 102 may increment its transmission power level by an amount proportional to the previous power level, for example a 25% increase, a 40% increase, a 50% increase, or some other increase.

When the first portable communication device 102 transitions between a level of transmit power that succeeds in communicating with the second portable communication device 104 and a level of transmit power that fails to communicate with the second portable communication device 104, it may begin seeking a threshold transmit power level by incrementing and/or decrementing transmission power in smaller amounts to define the threshold between successful wireless communication transmission power level and unsuccessful wireless communication transmission power level more precisely.

When the first portable communication device 102 has identified the power level at which communication with the second portable communication device 104 becomes unreliable, the first portable communication device 102 may determine a first transmission power level that is adjusted based on the power negotiation. For example, the transmission power setting associated with the minimum transmission power level that provided successful wireless communication may be defined to be the first transmission power level. Alternatively, the first transmission power level may be based on the transmission power setting associated with the minimum transmission power level that provided successful wireless communication adjusted higher to provide a margin of robustness.

In an embodiment, the first transmit power level determined by the processing of block 202 may be determined once and remain at a fixed value for an extended period of time. For example, the first transmit power level may remain set at the value determined in block 202 until the first portable communication device 102 undergoes a power cycle or until a user initiated power level negotiation is invoked from the interface of the first portable communication device 102. Unlike communication using a cellular transceiver to communicate with a base transceiver station 150 where the radio environment may dynamically change over short periods of time due to mobility and due to changes of weather, the radio environment between the first portable communication device 102 and the second portable communication device 104 may be expected to remain substantially constant for extended periods of time. Because of this substantially constant radio environment the power transmission levels may be set at lower levels and/or with lower signal to noise ratios than is done when the cellular transceiver negotiates power levels with a base transceiver station 150. This lower transmission level can have advantages for conserving battery power of the portable communication devices 102, 104.

At block 204, the value of the first transmission power level is stored in the first portable communication device 102, for example in a memory of the first portable communication device 102 and/or in a memory of the second portable communication device 104. At block 206, the first portable communication device 102 transmits wireless communication to the second portable communication device 104 at a power level limited by the first transmission power level. For example, the first portable communication device 102 transmits wirelessly at about the first transmission power level via the unlicensed radio spectrum band to the second portable communication device 104. Alternatively, the second portable communication device 104 transmits wirelessly at about the first transmission power level via the unlicensed radio spectrum band to the first portable communication device 102. In an embodiment, a second triggering event may occur, and the processing of blocks 202, 204, and 206 may be repeated. In an embodiment, the first triggering event and/or the second triggering event may be the event of the first portable communication device 102 powering on, which may be referred to in some contexts as power cycling the device. In an embodiment, the processing of blocks 202, 204, and 206 may be substantially repeated with the devices 102, 104 reversing the roles and actions described above. In an embodiment, the processing of blocks 202, 204, and 206 may desirably be performed after completion of alignment of the beam 175 of the antenna 173 as described further above.

Figure 6:
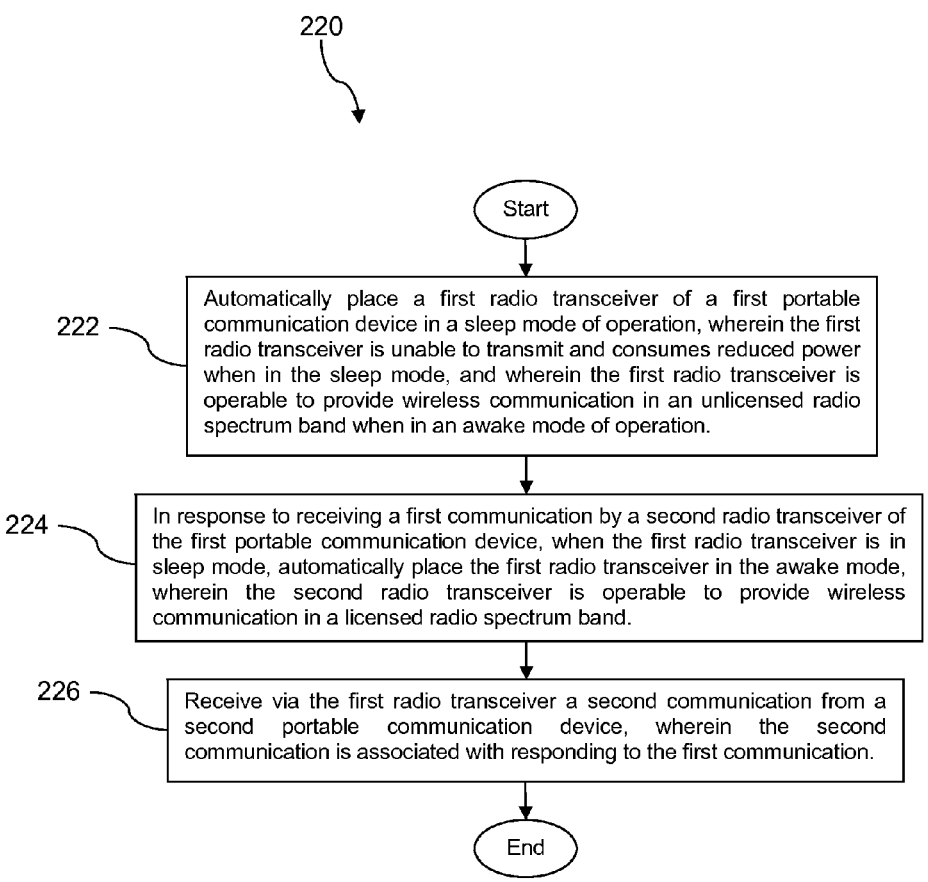
FIG. 6 is a flow chart of a method according to an embodiment of the disclosure.

Turning now to FIG. 6, a method 220 is described. At block 222, a first radio transceiver of a first portable communication device 102 is automatically placed into a sleep mode of operation. In an embodiment, the first portable communication device 102 may be the second portable communication device 104 described above. When in the sleep mode, the first radio transceiver is unable to transmit and consumes reduced power. The first radio transceiver is operable to provide wireless communication in an unlicensed radio spectrum band when in an awake mode of operation, for example in the WiFi radio spectrum, in the BLUETOOTH radio spectrum, or in other radio spectrum associated with other short range wireless communication protocols. The sleep mode may be initiated after the passage of a predefined period of time without receiving any control inputs or communications from external devices.

At block 224, in response to receiving a first communication by a second radio transceiver of the first portable communication device 102, when the first radio transceiver is in sleep mode, the first radio transceiver is automatically placed in the awake mode, wherein the second radio transceiver is operable to provide wireless communication in a licensed radio spectrum band. In an embodiment, the licensed radio spectrum band may be a code division multiple access (CDMA) spectrum band, a global system for mobile communications (GSM) radio spectrum band, a long-term evolution (LTE) radio spectrum band, a worldwide interoperability for microwave access (WiMAX), or another cellular licensed radio spectrum band.

At block 226, a second communication is received via the first radio transceiver from a second portable communication device 104. The second communication is associated with responding to the first communication. In an embodiment, the second portable communication device 104 may be the first portable communication device 102 described above. For example, the second communication may be a hypertext transport protocol (HTTP) message requesting the second portable communication device 104 to transmit a voice call dialer interface to the first portable communication device 102 to promote accepting a voice call.

In an embodiment, the devices 102, 104 may each transition to a reduced radio power level after a predefined duration of inactivity. The radio power level may be reduced by about 9 dB, about 12 dB, about 15 dB, or some other amount deemed effective for conducting low bandwidth handshaking communication between the devices 102, 104 while also conserving stored energy on the devices 102, 104. Such low bandwidth handshaking communication may be used to maintain a communication channel or link between the devices 102, 104. For example, when operating in the reduced radio power mode, the second portable communication device 104 may communicate handshaking messages via the second short range transceiver 124 to the first short range radio transceiver 106 of the first portable communication device 102 with a different modulation technique from the modulation technique used when other communications between the devices 102, 104 is being conducted, for example when the first portable communication device 102 is requesting content from the content server 156 via the web server 128 of the second portable communication device 104.

The modulation technique may rely on a lower transmission bit rate and/or an increased amount of redundancy in the information content in the transmitted handshaking messages. As a consequence of reducing the transmission bit rate and/or increasing the redundancy of the transmitted information content, it may be possible to demodulate the handshaking messages in a lower signal to noise ratio environment. In an embodiment, redundantly transmitted information may be utilized by the portable communication devices 102, 104 to aggregate a signal and boost the effective signal to noise ratio for receiving the subject message by adding corresponding parts of the signal. Noise, assumed to be random, may not sum additively, while information content of the message may sum additively, thereby raising the signal to noise ratio.

When the second portable communication device 104 receives an incoming voice call on its cellular voice transceiver 120, it may first return the second short range radio transceiver 124 to the normal power mode and then send a command to the first short range radio transceiver 106 to likewise return to the normal power mode. When the first portable communication device 102 receives a control input, for example a touchscreen of the first portable communication device 102 is touched, the first portable communication device 102 may first return the first short range radio transceiver 106 to the normal power mode and then send a command to the second short range radio transceiver 124 to likewise return to the normal power mode. The normal power mode may be the radio transmitter level that was negotiated between the portable communication devices 102, 104, for example as described further above with reference to FIG. 1 and method 200 and FIG. 5.

Figure 7:
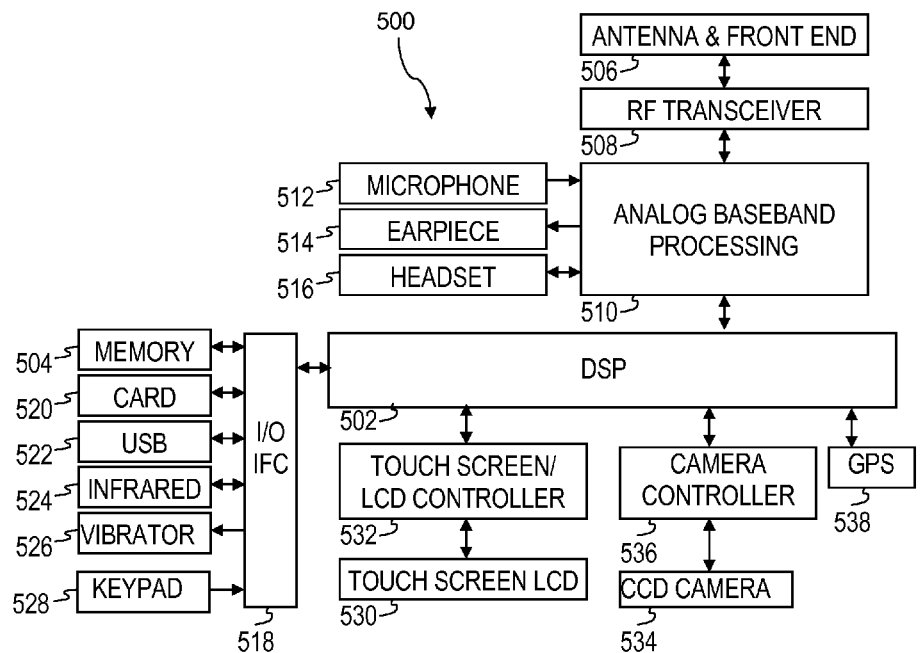
FIG. 7 is a block diagram of a communication device according to an embodiment of the disclosure.

FIG. 7 shows a block diagram of a portable electronic device 500 that may be suitable for implementing some embodiments of the first portable communication device 102 and/or the second portable communication device 104. While a variety of known components typically associated with mobile phones and/or personal digital assistants (PDAs) are depicted, in an embodiment a subset of the listed components and/or additional components not listed may be included in the portable electronic device 500. The portable electronic device 500 includes a digital signal processor (DSP) 502 and a memory 504. As shown, the portable electronic device 500 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the portable electronic device 500 may include another kind of display that does not provide a touch sensitive screen. In an embodiment, the DSP 502 may communicate directly with the memory 504 without passing through the input/output interface 518. Additionally, in an embodiment, the portable electronic device 500 may comprise other peripheral devices that provide other functionality.

The DSP 502 or some other form of controller or central processing unit operates to control the various components of the portable electronic device 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the portable electronic device 500 to function as a peripheral device to exchange information with a personal computer or other computer system. The infrared port 524 and other optional ports such as a BLUETOOTH interface or an IEEE 802.11 compliant wireless interface may enable the portable electronic device 500 to communicate wirelessly with other nearby handsets and/or wireless base stations.

The keypad 528 couples to the DSP 502 via the interface 518 to provide one mechanism for the user to make selections, enter information, and otherwise provide input to the portable electronic device 500. Another input mechanism may be the touch screen LCD 530, which may also display text and/or graphics to the user. The touch screen LCD controller 532 couples the DSP 502 to the touch screen LCD 530.

Figure 8:
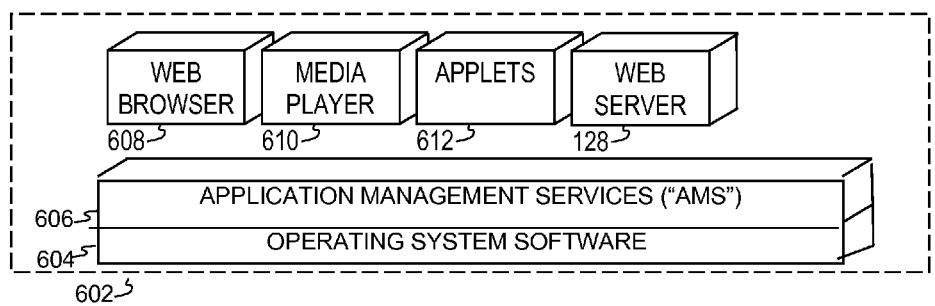
FIG. 8 is a block diagram of a software architecture of a communication device according to an embodiment of the disclosure.

FIG. 8 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the portable electronic device 500. Also shown in FIG. 8 are a web browser application 608, a media player application 610, JAVA applets 612, and the web sever 128 described above with reference to FIG. 1. The web browser application 608 configures the portable electronic device 500 to operate as a web browser, allowing a user to enter information into forms and select links to retrieve and view web pages. The media player application 610 configures the portable electronic device 500 to retrieve and play audio or audiovisual media. The JAVA applets 612 configure the portable electronic device 500 to provide games, utilities, and other functionality.

Figure 9:
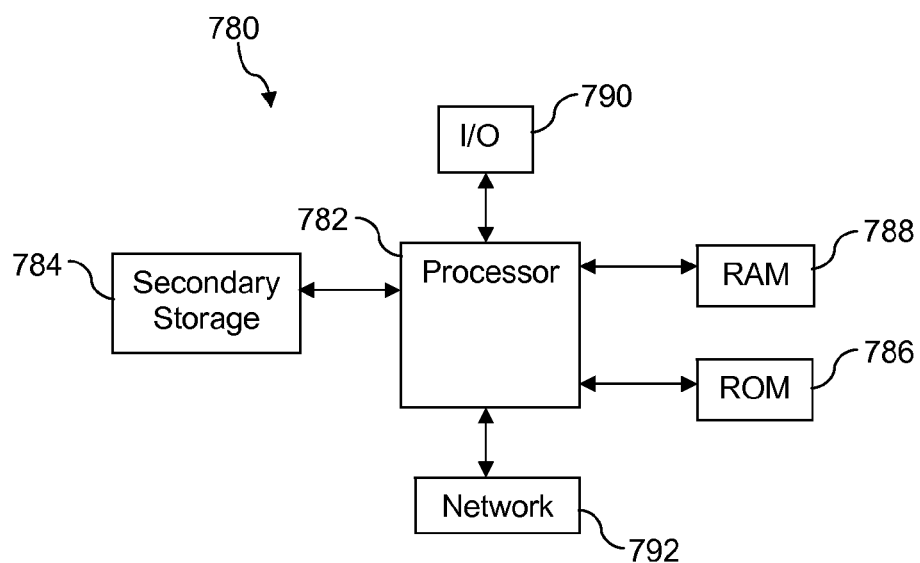
FIG. 9 is a block diagram of a computer system according to an embodiment of the disclosure.

FIG. 9 illustrates a computer system 780 suitable for implementing one or more aspects of the embodiments disclosed herein, for example the content server 156. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of power management in a portable communication device, comprising:
in response to a triggering event, negotiating, by a first portable communication device, a transmission power level for wireless communication in an unlicensed radio spectrum band with a second portable communication device,
wherein the first portable communication device is mechanically coupled to the second portable communication device, and
wherein the negotiating comprises:
transmitting, by the first portable communication device, messages to the second portable communication device at a plurality of different power levels;
receiving, by the first portable communication device, at least one acknowledgement message comprising information associated with one of the plurality of power levels, wherein the at least one acknowledgement message indicates that the one of the plurality of different power levels is a successful transmission power level; and
increasing, by the first portable electronic device, the successful transmission power level of the plurality of different power levels;
storing a value of the transmission power level in the first portable communication device; and
transmitting wireless communication by the first portable communication device to the second portable communication device at a power level limited by the transmission power level.

2. The method of claim 1, wherein the triggering event is a power-on of the first portable communication device and wherein the transmission power level is used to limit the power transmitted by the first portable communication device until the first portable communication device is power cycled.

3. The method of claim 1, further comprising:
in response to another triggering event, negotiating, by the first portable communication device, another transmission power level for wireless communication in the unlicensed radio spectrum band with the second portable communication device;
storing a value of the other transmission power level in the first portable communication device; and
transmitting wireless communication by the first portable communication device to the second portable communication device at a power level limited by the other transmission power level.

4. The method of claim 3, wherein the other triggering event is the activation of an input control of the first portable communication device.

5. The method of claim 3, wherein the other triggering event is an expiration of a period of time.

6. The method of claim 5, wherein the period of time is about a day.

7. The method of claim 1, wherein the first portable communication device and the second portable communication device each comprise a directional antenna, and further comprising in response to the triggering event, identifying, by the second portable communication device, a preferred antenna beam direction and directing an antenna beam in the preferred antenna beam direction.

8. The method of claim 1, wherein the successful transmission power level is one of a first successful transmission power level when an initial transmission power level of the plurality of different power levels is a lower value and each subsequent power transmission level of the plurality of different power levels is increased or a last successful transmission power level when the initial transmission power level of the plurality of different power levels is a higher value and each subsequent power transmission level of the plurality of different power levels is decreased.

9. The method of claim 1, wherein the triggering event is one of when the first portable communication device and the second portable communication device establish a communication link between them for the first time or after aligning an antenna beam of the second portable communication device.

10. The method of claim 1, wherein the successful transmission power level is increased by a predefined amount.

11. The method of claim 1, wherein the information associated with the one of the plurality of power levels comprises at least one of a signal strength value or a signal to noise ratio value.

* * * * *